(12) United States Patent
Wang et al.

(10) Patent No.: US 10,100,232 B2
(45) Date of Patent: *Oct. 16, 2018

(54) WOOD ADHESIVES CONTAINING REINFORCED ADDITIVES FOR STRUCTURAL ENGINEERING PRODUCTS

(71) Applicant: UNIVERSITY OF TENNESSEE RESEARCH FOUNDATION, Knoxville, TN (US)

(72) Inventors: Siqun Wang, Knoxville, TN (US); Cheng Xing, Edmonton (CA)

(73) Assignee: UNIVERSITY OF TENNESSEE RESEARCH FOUNDATION, Knoxville, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/977,678

(22) Filed: Dec. 22, 2015

(65) Prior Publication Data

US 2016/0115359 A1 Apr. 28, 2016

Related U.S. Application Data

(63) Continuation of application No. 12/809,656, filed as application No. PCT/US2008/087740 on Dec. 19, 2008, now Pat. No. 9,284,474.

(60) Provisional application No. 61/015,479, filed on Dec. 20, 2007.

(51) Int. Cl.
| | |
|---|---|
| *C09J 11/04* | (2006.01) |
| *C09J 161/06* | (2006.01) |
| *C09J 11/08* | (2006.01) |
| *C08K 7/04* | (2006.01) |
| *C08K 3/34* | (2006.01) |
| *C09J 101/02* | (2006.01) |
| *C08J 3/20* | (2006.01) |
| *E04C 2/16* | (2006.01) |

(52) U.S. Cl.
CPC ............ *C09J 101/02* (2013.01); *C08J 3/203* (2013.01); *C09J 11/04* (2013.01); *C09J 11/08* (2013.01); *C09J 161/06* (2013.01); *E04C 2/16* (2013.01); *C08J 2461/10* (2013.01); *C08K 3/346* (2013.01); *C08K 7/04* (2013.01); *C09J 2461/00* (2013.01); *Y10T 428/249925* (2015.04)

(58) Field of Classification Search
CPC ..... E04C 2/12; E04C 2/14; E04C 2/16; E04C 2/18
USPC ................ 524/445–447; 106/157.71, 416; 428/454, 343–356, 355 R–355 N
See application file for complete search history.

(56) References Cited

U.S. PATENT DOCUMENTS

| | | | | |
|---|---|---|---|---|
| 2,892,731 | A | * | 6/1959 | Claxton ................ C09J 103/02 106/205.7 |
| 3,627,627 | A | * | 12/1971 | Nobell ................... C09J 161/06 156/335 |
| 3,907,728 | A | | 9/1975 | Lambuth et al. |
| 5,114,537 | A | | 5/1992 | Scott et al. |
| 5,122,550 | A | | 6/1992 | Schmitt |
| 5,416,140 | A | | 5/1995 | Columbus et al. |
| 6,702,969 | B2 | | 3/2004 | Matuana et al. |
| 8,647,468 | B2 | | 2/2014 | Heiskanen et al. |
| 8,728,273 | B2 | | 5/2014 | Heiskanen et al. |
| 8,835,141 | B2 | | 9/2014 | Zhu et al. |
| 8,871,056 | B2 | | 10/2014 | Gane et al. |
| 8,871,057 | B2 | | 10/2014 | Gane et al. |
| 8,945,346 | B2 | | 2/2015 | Bjoerkqvist et al. |
| 2003/0092855 | A1 | * | 5/2003 | Miller .................... B27N 3/002 525/495 |
| 2003/0109603 | A1 | | 6/2003 | Drzal et al. |
| 2003/0186049 | A1 | | 10/2003 | Czaplicki et al. |
| 2004/0259218 | A1 | | 12/2004 | Weimer et al. |
| 2005/0013982 | A1 | | 1/2005 | Burgueno et al. |
| 2007/0213418 | A1 | | 9/2007 | Vermillion et al. |
| 2008/0090939 | A1 | | 4/2008 | Netravali et al. |
| 2009/0127516 | A1 | | 5/2009 | Kotaki et al. |
| 2009/0298976 | A1 | | 12/2009 | Yano et al. |
| 2011/0277947 | A1 | | 11/2011 | Hua et al. |
| 2011/0293932 | A1 | | 12/2011 | Jiang et al. |
| 2012/0107480 | A1 | | 5/2012 | Gane et al. |
| 2012/0136146 | A1 | | 5/2012 | Heiskanen et al. |
| 2013/0000855 | A1 | | 1/2013 | Nuopponen et al. |
| 2013/0017394 | A1 | | 1/2013 | Hua et al. |
| 2013/0126112 | A1 | | 5/2013 | Gane et al. |
| 2014/0124150 | A1 | | 5/2014 | Sabourin et al. |
| 2014/0378676 | A1 | | 12/2014 | Lauraeus et al. |
| 2015/0299955 | A1 | | 10/2015 | Laukkanen et al. |
| 2015/0330024 | A1 | | 11/2015 | Gane et al. |
| 2016/0355710 | A1 | | 12/2016 | Feng et al. |

FOREIGN PATENT DOCUMENTS

| | | |
|---|---|---|
| CA | 2 705 970 | 6/2009 |
| JP | 09-124950 | 5/1997 |
| JP | 2006-312281 | 11/2006 |
| WO | WO 2007/011313 | 1/2007 |
| WO | WO 2007/049666 | 3/2007 |
| WO | WO 2014/070452 | 5/2014 |
| WO | WO 2014/111854 | 7/2014 |
| WO | WO 2016/196983 | 12/2016 |

OTHER PUBLICATIONS

Weights of Building Materials, Agricultural Commodities, and Floor Loads for Buildings, http://www.age.psu.edu/extension/factsheets/h/H20.pdf, archived Apr. 15, 2004.*

(Continued)

*Primary Examiner* — Arti Singh-Pandey
*Assistant Examiner* — Frank Vineis
(74) *Attorney, Agent, or Firm* — Saliwanchik, LLoyd & Eisenschenk (57) ABSTRACT

The present disclosure relates to additives used in conjunction with adhesives to give enhanced performance. Engineered composite wood materials and methods of making such materials are also provided by the subject application. A reinforced adhesive includes an adhesive and an additive material comprising nanoscopic and microscopic materials.

13 Claims, 1 Drawing Sheet

(56) References Cited

OTHER PUBLICATIONS

Ragauskas, Fast Curing of Composite Wood Products, Apr. 26, 2006.*

Mansouri, "Improved water resistance of UF adhesives for plywood by small pMDI additions" Holz als Roh- und Werkstoff (2006) 64 : 218-220 (Year: 2005).*

Written Opinion in International Application No. PCT/US2008/087740, dated Aug. 10, 2009, pp. 1-7.

Ellis, S. "Effect of Resin Particle Size on Waferboard Adhesive Efficiency" *Wood and Fiber Science*, 1993, pp. 214-219, vol. 25, No. 3.

Geng, X. et al. "Characteristics of Paper Mill Sludge and Its Utilization for the Manufacture of Medium Density Fiberboard" *Wood and Fiber Science*, 2007, pp. 345-351, vol. 39, No. 2.

Marques-Marinho, F. et al. "Cellulose and Its Derivatives Use in the Pharmaceutical Compounding Practice" Chapter 8 in Cellulose— Medical, Pharmaceutical and Electronic Applications, *Intech*, 2013, pp. 141-162.

Edgar, K. et al. "Advances in cellulose ester performance and application" *Progress in Polymer Science*, 2001, pp. 1605-1688, vol. 26.

Gougeon Brothers, Inc., "West System 403 Microfibers Material Safety Data Sheet," MSDS#403-04a, Jan. 5, 2004, pp. 1-5.

Adhesive Technologies Ltd., "West System Product Overview," Feb. 2, 2004, pp. 1-3.

Wen-Hua, L., et al., "Preparation and characterization of wood/montmorillonite nanocomposites," *For. Stud. China*, 2006, vol. 8, No. 1, pp. 35-40.

Netafim, "Mesh. vs. Micron Comparison Chart," Mar. 19, 2014, p. 1.

Nakagaito, A.N., et al., "The effect of morphological changes from pulp fiber towards nano-scale fibrillated cellulose on the mechanical properties of high-strength plant fiber based composites," *Applied Physics A*, 2004, vol. 78, pp. 547-552.

* cited by examiner

WOOD ADHESIVES CONTAINING REINFORCED ADDITIVES FOR STRUCTURAL ENGINEERING PRODUCTS

CROSS-REFERENCE TO RELATED APPLICATIONS

This application is a continuation of U.S. application Ser. No. 12/809,656, filed Jun. 21, 2010, which is the U.S. national stage application of International Patent Application No. PCT/US2008/087740, filed Dec. 19, 2008, which claims the benefit of U.S. Provisional Application Ser. No. 61/015,479, filed Dec. 20, 2007, the disclosures of all of which are hereby incorporated by reference in their entirety, including all figures, tables and amino acid or nucleic acid sequences.

BACKGROUND OF THE INVENTION

Composite wood products, also known as engineered wood products, consist of wood-derived materials combined with other materials to form an aggregate material. An example is plywood, in which thin veneers of wood are joined together with adhesive to form a flat panel. Other examples of composite wood products include particle board, wafer board, gluelam beams, structural composite lumber, oriented strand board (OSB), and oriented strand lumber (OSL).

Composite wood products offer greater strength, reliability, and consistency compared to conventional lumber. Localized defects such as knots or density variations can be minimized or eliminated through the manufacturing process, giving a uniform product that is highly resistant to warping or splitting. More highly engineered products, such as OSB, typically perform within closer tolerances than less highly engineered products, such as plywood. Composite wood products use wood resources very efficiently because they may be manufactured from much smaller trees than conventional lumber, reducing the need to harvest "old growth" forests. About 85-90% of a log can be used to make high quality structural panels, and the remainder—bark, saw trim, and sawdust—can be converted into energy, pulp chips or bark dust.

However, one of the drawbacks of engineered products such as OSB is that it is often about 10-40% heavier than similarly-dimensioned plywood. The higher OSB weight is a concern among builders and other users of the products, especially where the product must be transported and handled by hand, such as on roofs. Consequently, a lighter weight OSB that maintains requisite strength performance is highly desirable.

Adding additives such as extenders or fillers into adhesive is a common practice in the manufacture of plywood. The purposes of adding filler or extender to an adhesive include increasing the initial viscosity, shortening the assembly time, preventing excessive penetration of adhesive into the wood, adding strength and reducing cost. However, conventional additives are not suitable for OSB and OSL production because of the method of applying adhesive. In plywood production, adhesive resin is applied to veneers by roller and sufficient adhesive is applied to form a continuous glue line. In contrast, in OSB and OSL production, the adhesive is typically atomized into fine resin drops (roughly 40-60 micrometers in diameter) as it is applied to the wood strands. Only a minimal amount of resin is used and a continuous glue line is not formed.

Thus, there is a need for a reinforced adhesive resin suitable for use in the production of lightweight OSB, OSL, and other engineered composite wood products.

BRIEF SUMMARY OF THE INVENTION

The present disclosure relates to additives used in conjunction with adhesives to give enhanced performance (sometimes referred to herein as a reinforced adhesive or reinforced resin). Engineered composite wood materials and methods of making such materials are also provided by the subject application. A reinforced adhesive includes an adhesive and an additive material comprising nanoscopic and microscopic materials.

DETAILED DISCLOSURE OF THE INVENTION

The present disclosure relates to additives used in conjunction with adhesives to give enhanced performance. In exemplary embodiments, the additive-enhanced adhesives may be used in the manufacture of engineered composite wood materials. When used in combination with the adhesive, the additives effect a desired modification in the structural properties of the composite material, such as an increase in strength.

Thus, reinforced adhesives according to the present disclosure allow manufacturers to make less dense and therefore lighter boards without compromising strength, thereby leading to handling ease and significant savings in raw materials and transportation costs. Moreover, instead of traditional aspen and pine woods, manufacturers may be able to use traditionally less desirable, lower quality and higher density wood species such as oak and maple.

OSB is a composite wood product manufactured from cross-oriented layers of rectangular shaped wood strands joined together with adhesive. OSB panels share many of the strength and performance characteristics of plywood. Currently, about 40 OSB plants across the United States consume an estimated 2.1 billion tons of wood annually and generate revenue of roughly 4 billion dollars. OSB has become a very important building product, now accounting for 65% of the sheathing market in the residential housing sector.

In the first phase of OSB manufacture, logs are debarked and cut to a uniform length. The logs are then turned into strands or wafers. The strands are dried with heat in a large rotating drum which is screened to grade for strands that are the correct size. The dried strands are sprayed with liquid or powder adhesive resin and then transported in layers on a conveyer system to a forming line, where the layers are cross-oriented into mats. A small amount of wax is also used to prevent moisture absorption into the boards during brief periods of wetting. For face layers, the strands generally run along the panel, while for core layers, the strands are randomly oriented or run across the panel. The mats are trimmed to a workable size and then moved to a press, where the wood strands and adhesive resin are bonded together under heat and pressure to cure the resin and consolidate the loose mat into a rigid panel. Finally, the panels are cut to size.

Nanomaterial and micromaterial additives are shown herein to improve the structural properties of resins/adhesives. Nanoscale materials include, for example, high surface area montmorillonite clay, which is in excess of 750 $m^2$/gram and has a high aspect ratio (about 70 to 150) and high aspect ratio nano-cellulose fibril (10 to 250). Microscale materials include, for example, high aspect ratio micro scale cellulose fibers (10 to 50). The percentage of additives (dry weight) based on resin (dry weight of resin) can be 0-10% nanoclay or microclay, 0-20% nanofiber or nanotubule and 0-20% microfiber or microtubule celluloses (however, at least one of these additives must be added to form a "reinforced resin/adhesive"). The nanoclay, nanofiber, nanotubule, and microfiber or microtubule celluloses materials, or a combination of these, have higher surface area and aspect ratios, and are used as additives in adhesive resins. Use of such enhanced resins in the production of composite wood products yields corresponding improvements in the structural properties of these products. For example, increases in modulus of elasticity, modulus of rupture, and internal bonding strength have been demonstrated. Nanomaterial-reinforced adhesives are superior to adhesives reinforced with conventional larger-dimensioned fillers. In addition, larger-dimensioned fillers cannot be used for discontinuously bonded wood composites, because it results in large resin droplets and poor resin distribution. For example, nanomaterial-reinforced adhesives may be used in applications requiring atomization of the adhesive into small droplets, as in the production of OSB and other wood composites, including particleboard and fiberboard. Teachings of this disclosure may be applied to wood composites including, for example, plywood, laminated veneer lumber (LVL), particle board, fiberboard, wafer board, gluelam beams, structural composite lumber, oriented strand board (OSB), oriented strand lumber (OSL) and parallel strand lumber (PSL).

As used in this disclosure, "adhesive" means a substance capable of holding materials together via a surface attachment. Adhesives are frequently sub-classified, for example by physical form (e.g., liquid adhesive or tape adhesive), chemical type (e.g., silicate adhesive or resin adhesive), materials bonded (e.g., rubber adhesive or can label adhesive), or condition of use (e.g., hot setting adhesive or room temperature setting adhesive). Mechanisms which may contribute to the capability of a particular adhesive to hold materials together include, for example, chemical bonding, hydrogen bonding, Van der Waals forces, and mechanical attachment. In exemplary embodiments, an adhesive has a particle size between about 200 and about 1,000 mesh.

Suitable adhesive resins used to make OSB, plywood and other composite wood products include polymers, which are long chain-like molecules. Polymers can occur naturally (as cellulose and lignin in trees, for example) or as man-made materials (such as polyethylene). Some polymers, called thermoplastics, melt when heated. Another type of polymer is known as a thermoset. While some of the precursors to thermosetting polymers can melt and flow upon heating, they eventually cure to a rigid form that is unaltered by subsequent heating. Thermoset resins are particularly suitable for use according to the present disclosure.

The term "curing" is used to describe the conversion of short polymer chains into a large, three-dimensional polymer. Adjacent molecules in a liquid resin droplet, or powder particle, quickly react with each other to form a three-dimensional, cross-linked network. Cured resin particles bond with wood wherever they contact it, effectively sticking adjacent strands together throughout the board. These droplets of adhesives are often visible as tiny red/brown spots on the surface of OSB panels when phenol formaldehyde resins are used. Once curing is complete, the molecules that make up the adhesive are no longer reactive under normal use conditions. One of the main benefits of thermosetting adhesives is the chemical stability of the glue bonds.

Two types of resins dominate OSB production; they are phenol-formaldehyde (PF) and poly (diphenylmethane diisocyanate) (pMDI or MDI). Other suitable resins include, but are not limited to, liquid phenolic resins, powdered phenolic resins, amino-based resins (UF), melamine formaldehyde (MF), melamine-urea-formaldehyde (MUF), phenol-urea-formaldehyde (PUF), melamine-urea-phenol-formaldehyde (MUPF), phenol-melamine-urea-formaldehyde (PMUF), protein adhesive, natural phenolic adhesives, epoxy resin, unsaturated polyester and a combination of these, such as a hybrid resin (e.g., pMDFUF or pMDI/PF).

PF is one of the dominant resins used in OSB and plywood production. Cured PF is considered waterproof and the resin is considered the benchmark of comparison when determining the water resistance of other adhesives for wood products. Although the cured PF resin is unaffected by exposure to water, panels bonded with the resin are predominately intended for only occasional, short-term exposure to moisture. Resin manufacturers produce PF adhesives by reacting phenol and formaldehyde in a high pH (alkaline) water solution. The reaction is stopped at a low degree of conversion. The short chain PF molecules can penetrate into the wood cell walls or hollow spaces inside wood cells. Curing the resin converts the soluble, short chain molecules into an insoluble three-dimensional network and primarily forms mechanical bonds between the wood and resin.

What is referred to as liquid PF resin is an alkaline water-based solution of low molecular weight PF chains. The amount of solid PF remaining after the water is removed is referred to as the "percent solids content" of the resin. Typically, liquid PF used in OSB production ranges from 40-60% solids content. During hot pressing, most of the water is vaporized, allowing the resin to cure. Advantages to using liquid PF include lower cost, greater ease of handling and application, and better strand coverage at normal loadings, when compared to powdered PF. The liquid resins also adhere to strands better than the dry powdered resins. However, liquid PF is more difficult to use successfully when the intended panel applications require high resin content, since the addition of more water accompanies the addition of more resin. Excessive moisture can lead to the generation of relatively large amounts of steam pressure during pressing. When the steam pressure exceeds the tensile strength of the adhesive bonds, defects known as "blows" or steam blisters occur.

Solid PF is produced by spray-drying PF solutions, yielding a powder or flake. This resin is more expensive to manufacture, but costs less to transport and can be stored for much longer periods of time, provided that it is kept dry and cool. Because the resin is not fully cured when it is dried, it briefly melts when it is heated in the press. The resulting liquid resin interacts with the wood, penetrates, and forms the basis for a mechanical bond after the resin cures. While not a part of the resin formulation, moisture is needed to help transfer heat in the mat as steam. Since no moisture accompanies the application of the resin during the blending operation, all of the moisture in the mat comes from the wood. When powdered PF is used, the wood does not have to be as dry as it does when liquid PF is used. Reduced drying time can result in energy savings for a mill. Although the adhesion of dried resin powder to wood strands can be problematic when producing higher resin content OSB, bonds formed using low resin loadings tend to be stronger, since solid PF does not tend to overpenetrate into the strands. When powered PF is used, it is often applied during or after wax application. This helps facilitate even resin distribution on the strands.

Poly (diphenylmethane diisocyanate) (pMDI) has become a common resin used in OSB production, despite costing significantly more than PF. Like PF, it produces waterproof bonds. In fact, the nature of its adhesion to wood makes its performance better than PF when exposed to moisture. Unlike PF, pMDI does not primarily form mechanical bonds with the wood substrate; it is also capable of forming covalent chemical bonds with wood. These chemical bonds are stronger and more stable than mechanical linkages, so manufacturers can potentially use less resin to achieve similar, or greater, performance with lower adhesive resin loadings than with PF. Lower resin loading saves money, which can help to offset the increased cost per unit of adhesive. Some advantages associated with using pMDI adhesive include greater tolerance for higher moisture content wood, lower press temperatures, and faster press cycles. The combination of reduced costs (energy savings and lower resin usage) and increased productivity (reduced pressing cycle time) can help offset the additional cost of the adhesive. Because of the chemistry involved, pMDI-bonded products can be used in more demanding applications where increased water resistance is required. Potential disadvantages associated with pMDI use include the following: the need to use a mold release since pMDI will bond to metal surfaces and stick panels to press platens and cauls; a greater need to monitor environmental conditions around the press and blenders due to health risks associated with uncured pMDI in aerosol form; special storage consideration to protect pMDI from contact with atmospheric moisture, which can cause precure; and questions regarding the resistance of pMDI-bonded products to deformation under long-term loading conditions.

Adhesive resins may include additives such as fillers and extenders. Fillers are generally defined as relatively nonadhesive substances added to an adhesive binder to improve its working properties, strength, or other qualities. Extenders generally exhibit some adhesive properties.

Suitable nanoscopic and microscopic resin additive materials include, but are not limited to, cellulose and/or carbon nanofibers and microfibers, nanoclays and microclays, cellulose or carbon nanotubules or microtubules, cellulose nanofibers (such as microfibrillated cellulose, microcrystalline cellulose, cellulose nanocrystal, bacterial cellulose, cellulose micro/nanofibril, cellulose whisker, cellulose crystallines), cellulose or carbon fibers, or combinations thereof (e.g., microtubules, nanotubules, microfibers and nanofibers, etc.). When added to a resin formulation, the amount of nanoscopic and/or microscopic additives can be provided as a percentage that is calculated on the basis of the weight of dry resin (dry weight of additives/dry weight resin).

Nanoclay is a clay mineral with a phyllosilicate or sheet structure with a thickness of the order of 1 nm and surfaces of perhaps 50-150 nm in one dimension. The mineral base can be natural or synthetic and is hydrophilic. The clay surfaces can be modified with specific chemistries to render them organophilic and therefore compatible with organic polymers.

In order to take advantage of the high aspect ratio and nanometer-scale thickness of nanoclays, it is necessary that the resin polymer penetrate the interlayer gallery of the nanoclay (intercalation), or nanoclay is exfoliated and dispersed in resin polymer. In an exemplary embodiment, nanoclay is added into cellulose powder suspension and then the mixture is treated under ultrasound. The cellulose powders are fibrillated into cellulose fibril aggregates and at the same time, nanoclay is well dispersed into cellulose fibril aggregates. Other methods could be used to replace ultrasonic treatment for fibrillation and dispersion, such as high pressure refiner treatment, grinder treatment, microfluidizer, high pressure homogenizer treatment and chemical treatment.

Cellulose microfibers are cellulose particles with size between about 200 and about 1,000 mesh. They can be produced directly from wood pulp, wood flour and any natural materials containing cellulose by mechanical methods, such as grinding between disks, beating with impactors or hammers as in hammer mills, or crushing between rollers as in roller mills. Cellulose fibril and fibril aggregates are the mixture of cellulose nanofibril, microfibril and cellulose fibers produced from wood pulp or cellulose microfibers by ultrasonic treatment, high pressure refiner treatment, grinder treatment, microfluidizer, or high pressure homogenizer treatment. Many resources can be used for fibril isolation, such as wood fibers, wood flour, cotton, lyocell fiber, sugar beet pulp, sea animals such as tunicate mantles, potato tuber cells and any material containing cellulose. The raw materials could be pretreated by chemical treatment, biological treatment to enhance fibril isolation or increase cellulose content by removing other components such as lignin, hemicellulose. One disadvantage of cellulosic fibers for their application in industry is the strong hydrophilic nature of their surface, which inhibits homogeneous dispersion in non-polar polymers and causes a weak interface, thus reducing the mechanical properties of reinforced adhesives. Cellulose surfaces can further be modified with specific chemistries to become hydrophobized in order to be used in non-polar resins such as pMDI or epoxy resin system. Methods include, but are not limited to, surface derivatization, grafting with polyethylene glycol, 3-aminopropyltriethoxysilane, or 3-glycidoxypropyltrimethosysilane, surfactant adsorption or surface silylation with chlorodimethyl isopropylsilane.

In an exemplary embodiment, a combination of nanoscopic and microscopic additive materials is used in combination with phenol-formaldehyde (PF) resin for production of oriented strand board or other engineered wood products. The additive-enhanced PF resin is shown to be capable of increasing internal bonding strength (IB), modulus of rupture (MOR), and modulus of elasticity (MOE) for OSB. The ratios (w/w) of additive materials (macrofiber/fibril/microfiber/nanofiber/microtubule/nanotubule:nanoclay/microclay) added to a resin can range from 0:1 to 1:10 or 10:1 to 1:0. Thus, exemplary ratios (w/w) of microfibers and/or nanofibers to nanoclays can be about 1:0, 1:1, 2:1, 3:1, 4:1, 5:1 or 6:1. Alternatively, the ratios can be expressed as about X:Y, wherein X is any integer selected from 0 to 20 and Y is any integer selected from 0 to 20. In certain embodiments, only cellulose macrofibers and/or cellulose fibril aggregates are added to a resin (i.e., no nanoclay or microclay is added (expressed in some contexts as a ratio of 1:0). These various embodiments may be referred to as a reinforced adhesive comprising an adhesive and an additive material comprising cellulose microfiber only or cellulose fibril aggregates only (and are to be understood to have been formulated without the addition of nanoclays and/or microclays.

The terms "composite wood products" and "engineered wood products" can be used interchangeably within this application. These terms include, and are not limited to, plywood, particle board, wafer board, gluelam beams, structural composite lumber, oriented strand board (OSB), and oriented strand lumber (OSL). Other lignocellulosic materials can also be used to manufacture composite wood products, and include straw, hemp fiber, kenaf fiber or mixtures thereof.

Following are examples which illustrate procedures for practicing the invention. These examples should not be construed as limiting. All percentages are by weight and all solvent mixture proportions are by volume unless otherwise noted.

Materials

Example 1

1. Fibers: TC40 (available from CreaFill Fibers Corp.). Average fiber dimension: 30 µm×18 µm×1-2 µm.
2. PF resin: Core layer phenol formaldehyde resin 205C (available from G-P Chemical Corp.).

Example 2

1. Fibers: TC40 (available from CreaFill Fibers Corp.). Average fiber dimension: 30 µm×18 µm×1-2 µm.
2. PF resin: Core layer phenol formaldehyde resin 205C (available from G-P Chemical Corp.).
3. Strands: Commercial southern pine strands (from Huber Engineering Woods Corp.). Average strands dimension: 4.75 inch×0.63 inch×0.039 inch.

Example 3

1. Fibers: TC40 (available from CreaFill Fibers Corp.). Average fiber dimension: 30 µm×18 µm×1-2 µm.
2. Commercial nano-clay BEN-Gel HVP (Layered phyllosilicate, available from Houjun Yoko Kabushiki Kaisha, Japan).
3. Nano-clay, nano-cellulose fibers and micro-cellulose mixture: 4 parts of TC40 and 1 part Nano-clay treated in distilled water by ultrasonic system for 15 minutes.
4. Wax emulsions: Cascowax-EW-58A (available from Hexion Specialty Chemicals Inc.).
5. PF resin: 1385C for core layer and 1355F for face layer (available from Dynea USA Inc.).
6. Strands: lab made southern pine strands from GP chemical Corp. Average strands dimension: 2.83 inch×0.56 inch×0.035 inch.

Example 4

1. Nano-clay, nano-cellulose fibers and micro-cellulose mixture: 4 parts of TC40 and 1 part Nano-clay treated in distilled water by an ultrasonic system for 15 minutes.
2. Wax emulsions: Cascowax-EW-58A (available from Hexion Specialty Chemicals Inc.).
3. PF resin: 1385C for core layer and 1355F for face layer (available from Dynea USA Inc.).
4. Strands: lab made southern pine and red oak from L-P Corp. Average strands dimension: 6.1 inch×0.68 inch×0.034 inch.

Example 5

Resin: 13B 122 for face, PF-785 for core, Liquid Phenol Formaldehyde Resin (PF) of Arclin USA, Inc., directly provided by Arclin USA, Inc., and used as received.

Nano filler A: Add 2 g micro-cellulose fiber (TC-40) to 70-140 g distilled water in glass bottle. Treat the mixture for 15 minutes at 90% of full power by an ultrasonic system. After ultrasonic treatment, a centrifuge removed the most of the water in the mixture.

Nano filler B: Add 2 g micro-cellulose fiber (TC-180) and 0.5 g of nano clay to 70-160 g distilled water in glass bottle. Treat the mixture for 15 minutes at 90% of full power by an ultrasonic system. After ultrasonic treatment, a centrifuge removed the most of the water in the mixture.

Strands: Southern pine and hardwood mixed strands provided by Huber OSB mill at Spring City and lab made southern pine strands made in Louisiana-Pacific R&D center. The ratio of mill strand and lab strand was 5:3. The strands were dried to 2.73% moisture content at a dry-kiln.

The emulsion wax (Cascowax EW-58H/LV) was obtained from Hexion.

Example 6

Resin: 13A003, Liquid Melamine Urea Formaldehyde Resin (MUPF) of Arclin USA, Inc., directly provided by Huber Engineered Woods LLC., and used as received.

Nano fillers: Add 2 g micro-cellulose fiber (TC-40) and 0.5 g nano-clay to 70-140 g distilled water in glass bottle. Treat the mixture for 15 minutes at 90% of full power by an ultrasonic system. After ultrasonic treatment, a centrifuge removed the most of the water in the mixture.

Strands: Southern pine and hardwood mixed strands provided by Huber OSB mill at Spring City and lab made southern pine strands made in Louisiana-Pacific R&D Center. The ratio of mill strand and lab strand was 5:3. The strands were dried to 2.73% moisture content at a dry-kiln.

The emulsion wax (Cascowax EW-58H/LV) was obtained from Hexion.

Example 1

Commercially available cellulose microfibers were added to phenol-formaldehyde resin (GP 205C) to ascertain whether the structural performance of the bulk resin could be increased. These data are presented in Table 1 obtained by three-point bending method according to ASTM D 790 standard. Both modulus of rupture (MOR) and modulus of elasticity (MOE) were shown to be enhanced by the addition of cellulose microfibers. Even relatively low amounts of cellulose gave significant improvement. For example, 3% added cellulose microfiber (based on oven-dried weight of resin) resulted in a 24.1% increase in MOR (from 79 to 98 MPa) and a 31.6% increase in MOE (from 3388 to 4460 MPa).

Preparation of reinforcing PF resin composites for these examples was performed in the following manner:

a) Commercially available cellulose microfibers (TC40) were added to PF resin (GP 205C) and mixed by a mechanical mixer to obtain a uniform resin additives mixture.

b) To make PF composite films (2 mm thickness), 25 g mixture was added to a mold and vacuumed 30 minutes to remove bubbles inside of the mixture. The mixture was then oven dried for 12 hours at 70° C. to remove water. Finally, the PF composites films were hot-pressed for 4 minutes at 160° C. to cure the composites.

TABLE 1

Mechanical properties of phenol-formaldehyde
resin reinforced by cellulose additives.

| Cellulose Content (%) | MOR (MPa) | CV (%) | MOE (MPa) | CV (%) |
|---|---|---|---|---|
| 0 | 79 | 4.4 | 3388 | 9.2 |
| 1 | 92 | 7.4 | 4181 | 3 |
| 3 | 98 | 7.5 | 4460 | 5.8 |
| 5 | 92 | 1.9 | 4683 | 2.6 |
| 10 | 103.5 | 5.3 | 4677 | 3.8 |

Example 2

The uniform reinforced PF resin mixture (the same as in Example 1) was then used to produce OSB for testing. These data were obtained by the test method of ASTM D1037 standard and are presented in Table 2. At all levels of added cellulose, both internal bonding (IB) strength and MOR were increased. IB increased by as much as 9.3% (from 0.54 to 0.59 MPa when using a 4% cellulose formulation), and MOR (bending strength) increased by as much as 14.5% (from 26.9 to 30.8 when using a 4% cellulose formulation). MOE of OSB panels increased 12.1% to 3605 MPa by adding 4% of cellulose microfiber into resin (based on oven-dried weight of resin). Thickness swell (TS), an undesirable property, was reduced at all levels of added cellulose. Other properties of the oriented strand board generally tended to be improved by the use of reinforced resin, but the results were not entirely uniform. MOE was improved with resin formulations containing 4% and 8% cellulose (increases of 12.1% and 5.2% respectively) but MOE was degraded modestly (1.5% decrease) with a resin formulation containing 2% cellulose. Water absorption (WA), an undesirable property, was beneficially reduced with resin formulations containing 2% and 8% cellulose (decreases of 4.5% and 13.6% respectively), but WA was detrimentally increased by 10.6% when using a 4% cellulose formulation.

Preparation of reinforced OSB panels: The prepared reinforced resin mixture was blended to southern pine strands in a drum blender. The resinated strands were randomly formed to mat and hot-pressed to OSB panels. The following process conditions were used for making OSB panels:
(1) Panels dimension: 20 inch×20 inch×¾ inch
(2) Strand orientation: random
(3) Layered structure: one
(4) Wood species: southern pine
(5) Target density: 40 lbs/ft³
(6) Pressing temperature: 400° F.
(7) Pressing time: 5 minutes

TABLE 2

Improved mechanical properties of southern
pine OSB using reinforced PF resin.

| Cellulose content (%) | IB (MPa) | MOR (MPa) | MOE (MPa) | TS (%) | WA (%) |
|---|---|---|---|---|---|
| 0 | 0.54 | 26.9 | 3215 | 39 | 66 |
| 2 | 0.58 | 29.2 | 3166 | 34 | 63 |
| 4 | 0.59 | 30.8 | 3605 | 36 | 73 |
| 8 | 0.58 | 30.2 | 3381 | 38 | 57 |

Example 3

In another embodiment, a reinforced resin formula was produced by adding nano materials including commercially available nano materials. Results obtained by the test method of the ASTM D1037 standard are summarized in Table 3. Very narrow variations in panel thickness and density were achieved; differences in structural properties between panels are thus solely due to differences in resin formulations. As shown in Example 1, the 3% added cellulose microfiber (TC40) resulted in significant increases in MOR and MOE of PF resin (Table 1). This formulation "TC0" improved OSB properties with a 7.63% increase in MOE, a 3.59% increase in MOR and a 39.0% increase in internal bonding strength (Table 3).

The same raw materials as used in the formulation of TC40 were converted into cellulose fibril aggregates by 15 or 30 second ultrasonic treatment. The use of this ultrasonically treated adhesive formulation resulted in OSB having improved properties as compared to OSB manufactured with untreated TC40. For example, the formulation "TC30" improved OSB properties with a 9.40% increase in MOE, a 14.7% increase in MOR and a 35.7% increase in internal bonding strength. The "TCC15" formulation gave the greatest performance gain over unmodified PF resin. The formula TCC15 consists of 94.88% of wood, 1% wax, 4% phenol formaldehyde resin, 0.096% of cellulose fibril and 0.024% of nano-clay. The improvement by formula "TCC15" was most significant, with a 23.0% increase in bending modulus MOE and a 23.2% increase in internal bonding strength, both of which are important key performance requirements that the OSB industry must meet. Bending strength and thickness swell were also improved: it exhibited a 29.1% increase in MOR and a 9.9% decrease in TS. The performance of OSB constructed with the "TCC15" formulation confirms that while cellulose microfiber or its cellulose fibril aggregate can improve OSB performance, additive materials comprising cellulose fibril aggregates in combination with nanoclays have the highest potential to improve OSB properties. It appears that during ultrasonic treatment, nanoclays have well been dispersed into cellulose fibril aggregates. The final reinforced materials can easily be dispersed into resin via simple mechanical mixer and an ultrasonic mixer is not necessary to improve dispersion (confirmed by the "TCC30 and UTCC30" formulations).

Preparation of reinforcing PF resin wood composites for these examples was performed in the following manner:
a) Preparation of Nano-Cellulose Fibriles:
Add 2 g micro-cellulose fibers (TC40) or (2 g TC40+0.5 g nano-clay) TC40-nano-clay mixture to 70-100 g distilled water in a glass bottle. Treat the mixture for 0, 15 and 30 minutes at 90% of full power by an ultrasonic system. After ultrasonic treatment, a centrifuge removed most of the water in the mixture. The solid content of the mixture after water removal was 16-17%.

b) Preparation of Reinforced OSB Panels
The prepared nano-additives were added to both of core (PF 1385C), face (PF1355F) PF resins with a ratio of 3% (dry additives Wt/dry resin Wt), and mixed by a mechanical mixer to obtain a uniform dispersed PF resin. Wax (1%) was applied first and then the resin mixture was blended to southern pine strands in a drum blender. The resinated strands were randomly formed to mat and hot-pressed to OSB panels. The following process conditions were used for making OSB panels:
(1) Panels dimension: 20 inch×20 inch×¾ inch
(2) Strand orientation: random
(3) Wood species: southern pine
(4) Layered structure: three
(5) Target density: 40 lbs/ft³
(6) Pressing temperature: 400° F.
(7) Pressing time: 5 minutes

TABLE 3

Physical and mechanical properties of OSB using reinforced PF resin.

| RUN | MOE MPa | MOR MPa | IB MPa | WA % | TS % | Thickness mm | MC % | Density Kg/M³ |
|---|---|---|---|---|---|---|---|---|
| Pure PF | 3351 | 25.1 | 0.367 | 33.9 | 25.2 | 15.24 | 6.9 | 710 |
| TC0 | 3607 | 26.0 | 0.510 | 42.1 | 24.7 | 15.45 | 7.8 | 670 |
| TC0.25 | 3555 | 26.3 | 0.469 | 33.2 | 24.2 | 15.57 | 8.4 | 682 |
| TC15 | 3773 | 27.3 | 0.409 | 38.8 | 25.2 | 15.37 | 7.8 | 710 |
| TC30 | 3666 | 28.8 | 0.498 | 39.4 | 24.8 | 15.22 | 7.7 | 711 |
| TCC15 | 4122 | 29.1 | 0.452 | 33.1 | 22.7 | 15.25 | 7.8 | 702 |
| TCC30 | 3791 | 29.5 | 0.384 | 39.6 | 24.7 | 15.18 | 8.0 | 698 |
| UTCC30 | 3475 | 27.8 | 0.450 | 41.3 | 26.2 | 15.26 | 7.8 | 705 |

Note:
PF: phenol formaldehyde resin.
TC0: commercial micro cellulose fibers TC40 without any treatment and mixed with PF resin.
TC0.25: TC40 without any treatment and mixed with wood strands.
TC15: TC40 ultrasonic treated for 15 minutes.
TC30: TC40 ultrasonic treated for 30 minutes.
TCC15: TC40 plus nano-clay (4:1) ultrasonic treated for 15 minutes.
TCC30: TC40 plus nano-clay (4:1) ultrasonic treated for 30 minutes.
UTCC30 is similar to TCC30 but the mixing method was different. For UTCC, an ultrasonic mixer was used. For others, a mechanical mixer was used.

Example 4

In another embodiment, a reinforced resin formula was used to reduce the target density of OSB panels made of southern pine and red oak, respectively. For pine OSB, the target density of the control (PF resin without reinforcement) is 38 lbs/ft³ and for resin reinforced panels is 36 lbs/ft³. For red oak OSB, the target density of the control (PF resin without reinforcement) is 43 lbs/ft³ and the resin reinforced panels is 40 lbs/ft³. Results obtained by the test method of ASTM D1037 standard are summarized in Tables 4 and 5. The density of pine OSB can be reduced 4.4% by using nano-material reinforced PF resin while the panels maintain comparable properties to the control panel. For red oak OSB, the density can be reduced about 9.2%.

Example 5

Preparation of reinforcing PF resin wood composites for these examples was performed in the following manner:
a) Preparation of Nano-Cellulose Fibers:
Add 2 g micro-cellulose fibers (TC-40) and 0.5 g nano-clay to 70-100 g distilled water in a glass bottle. Treat the mixture for 15 minutes at 90% of full power by an ultrasonic system. After ultrasonic treatment, a centrifuge removed the most of the water in the mixture.
b) Preparation of Reinforcing OSB Panels
The prepared nano-additives were added to both core (PF 1385C) and face (PF 1355F) PF resins with a ratio of 3% (dry additives Wt/dry resin Wt) and mixed by a mechanical mixer to obtain a uniform resin/additives mixture. Wax (1%) was applied first and then the reinforced resin was blended to wood strands in a drum blender. The resinated strands were formed to mat and hot-pressed to OSB panels. The following process conditions were used for making OSB panels:
(1) Panels dimension: 20 inch×20 inch×7/16 inch
(2) Strand orientation: face and core were perpendicular to each other
(3) Layered structure: three
(4) Pressing temperature: 400° F.
(5) Pressing time: 4 minutes

TABLE 4

Physical and mechanical properties of Southern pine OSB.

| Filler % | Density lbs/ft³ | MOR (MPa) ⊥ | MOR (MPa) // | MOE (MPa) ⊥ | MOE (MPa) // | IB MPa | TS % | WA % |
|---|---|---|---|---|---|---|---|---|
| 0 | 38.6 | 20.2 | 41.7 | 2241 | 6321 | 0.48 | 21.9 | 48.2 |
| 3 | 36.9 | 18.8 | 44.5 | 2315 | 6822 | 0.42 | 22.9 | 55.6 |

TABLE 5

Physical and mechanical properties of red oak OSB.

| Filler % | Density lbs/ft³ | MOR (MPa) ⊥ | MOR (MPa) // | MOE (MPa) ⊥ | MOE (MPa) // | IB MPa | TS % | WA % |
|---|---|---|---|---|---|---|---|---|
| 0 | 43.6 | 16.0 | 37.9 | 1544 | 5905 | 0.45 | 21.6 | 34 |
| 3 | 39.6 | 14.4 | 34.6 | 1500 | 5597 | 0.37 | 26.0 | 47.8 |

Panel Making:
Experimental design (Table 6) included three control condition and two with nanofiller in the resin system. There were two repetitions for each condition. The parameters for panel making are as follows:
Panel thickness: 7/16"
Panel dimension: 24×24"
Panel density: 36; for control: 36, 38 and 40 lbs/ft³
Resin type: Face and Core PF
Panel structure: three layer
Face/Core Ratio: 60:40
Resin loading: 4%
Wax loading: 1%
Pressing temperature: 200° C.
Total pressing cycle: 5 min
Closing time: 50 seconds
Degas: 30 seconds

TABLE 6

Experimental design.

| Run | Filler % | Target Density (lbs/ft³) |
|---|---|---|
| 1 | 0 | 40 |
| 2 | 0 | 38 |
| 3 | 0 | 36 |
| 4 | 3 (Filler A) | 36 |
| 5 | 3 (Filler B) | 36 |

Figure 1:
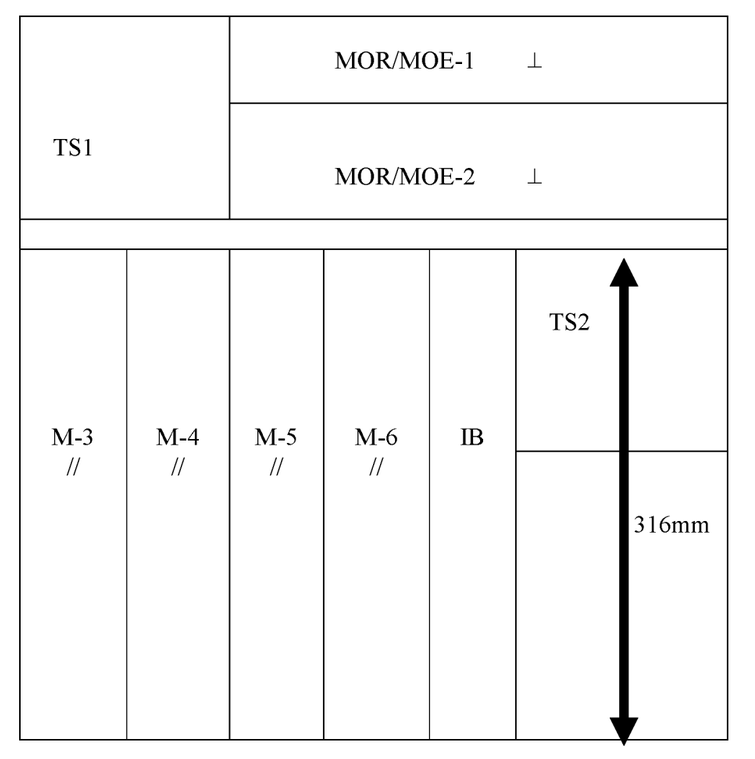
FIG. 1 illustrates the cutting pattern for samples analyzed as set forth in the Examples.

Panel Testing Procedure:
After pressing, the pressing direction for each panel was marked, and then the panel was trimmed into 20 by 20 in. and panel density was measured. The panels were conditioned to consistent weight in 65% RH and 23° C. conditions. The entire panel was cut into MOR/MOE specimens, IB, 24-hours TS and WA specimens as depicted in the cutting pattern shown in FIG. 1. Tests were done according to the method of ASTM D-1037.
Results:
The modulus and strength of OSB can significantly be increased by resin modification, as shown in Tables 7-8. For the case of Formula A, parallel modulus increased 22.2% and strength increased 23.6% comparing to the control Panel 2 with the similar panel density (around 38.7 lbs/ft³). For the case of Formula B, parallel modulus increased 22.8% and strength increased 18.4% comparing to the control Panel 3 with the similar panel density (around 37.7 lbs/ft³). Thus, the adhesive formulations provided herein have shown potential for making stronger composite products.

TABLE 7

Bending properties of reinforced phenol-formaldehyde made OSB.

| Run | Filler % | Density (lbs/ft³) | MOE // (Mpa) average | SD | MOE ⊥ (Mpa) average | SD | MOR // (Mpa) average | SD | MOR ⊥ (Mpa) average | SD |
|---|---|---|---|---|---|---|---|---|---|---|
| 1 | 0 | 41.8 | 7432.2 | 581.1 | 2408.9 | 145.0 | 45.8 | 4.32 | 19.7 | 1.91 |
| 2 | 0 | 38.9 | 5842.9 | 547.8 | 2066.0 | 490.5 | 31.4 | 4.63 | 17.1 | 4.17 |
| 3 | 0 | 37.9 | 5459.1 | 407.7 | 1876.2 | 217.5 | 29.9 | 4.65 | 14.6 | 1.97 |
| 4 | 3 | 38.6 | 7140.8 | 658.2 | 1848.4 | 428.3 | 38.8 | 6.38 | 17.5 | 3.40 |
| 5 | 3 | 37.7 | 6707.8 | 823.5 | 1443.5 | 200.2 | 35.4 | 5.73 | 11.8 | 2.26 |

TABLE 8

Physical properties of reinforced phenol-formaldehyde made OSB.

| Run | Filler % | Density (lbs/ft³) Average | STDV | MC (%) average | STDV | TS (%) average | STDV |
|---|---|---|---|---|---|---|---|
| 1 | 0 | 41.8 | 0.049 | 9.8 | 0.816 | 16.7 | 2.079 |
| 2 | 0 | 38.9 | 0.634 | 10.2 | 0.102 | 16.2 | 2.784 |
| 3 | 0 | 37.9 | 0.611 | 10.1 | 0.434 | 15.4 | 0.955 |
| 4 | 3 | 38.6 | 0.192 | 10.2 | 0.519 | 21.9 | 3.501 |
| 5 | 3 | 37.7 | 0.141 | 10.2 | 0.157 | 19.4 | 3.076 |

Example 6

Panel Making

Experimental design (Table 9) included three control condition and one with nanofiller in the MUPF resin system. There were two repetitions for each condition. The parameters for panel making are as follows:
Panel thickness: 7/16"
Panel dimension: 24×24"
Panel density: 36; for control: 36, 38 and 40 lbs/ft³
Resin type: Face and Core MUPF
Panel structure: three layer
Face/Core Ratio: 60:40
Resin loading: 4%
2% catalyst was added [25% $(NH_4)_2SO_4$] based on solid resin.
Wax loading: 1%
Pressing temperature: 200° C.
Total pressing cycle: 5 min
Closing time: 50 seconds
Degas: 30 seconds

TABLE 9

Experimental design.

| Run | Filler % | Target Density (lbs/ft³) |
|---|---|---|
| 1 | 0 | 40 |
| 2 | 0 | 38 |
| 3 | 0 | 36 |
| 4 | 3 | 36 |

Panel Testing Procedure:

After pressing, the pressing direction for each panel was marked, and then the panel was trimmed into 20 by 20 in. and panel density was measured. The panels were conditioned to consistent weight in 65% RH and 23° C. conditions. The entire panel was cut into MOR/MOE specimens, IB, 24-hours TS and WA specimens as illustrated in the cutting pattern depicted in FIG. 1. Tests were done according to the method of ASTM D-1037.

Results:

Table 10 shows physical and mechanical properties of OSB using MUPF. For each condition, measured real panel density was slightly higher than target density except for Control 3. The real measured density of reinforced OSB was 37.0 lbs/ft³, which was between Control 2 and Control 3. The MOE and MOR of Reinforced OSB were significantly higher than Control 2 and 3, especially in panel parallel direction and were very close to one of Control 1. That means the reinforced OSB with 37.0 lbs/ft³ density has similar bending performance with regular OSB having a density of 40.8 lbs/ft³ and has 3.8 lbs/ft³ density reduction.

TABLE 10

Physical and mechanical properties of MUPF OSB.

| Run | Filler % | Measured Density (lbs/ft³) | IB MPa | MOR (MPa) // | Vertical | MOE (MPa) // | Vertical | TS % | WA % |
|---|---|---|---|---|---|---|---|---|---|
| 1 | 0 | 40.8 | 0.406 | 37 | 14.4 | 6918 | 2052.1 | 21.9 | 32.5 |
| 2 | 0 | 38.3 | 0.305 | 30.6 | 19.3 | 5579.6 | 2354.7 | 21 | 32.2 |
| 3 | 0 | 35.9 | 0.299 | 24.7 | 12.7 | 5038.6 | 1979.4 | 21.1 | 32.9 |
| 4 | 3 | 37 | 0.284 | 35.6 | 13 | 6624.2 | 1828.7 | 21 | 34 |

Table 10 shows the reinforced OSB has similar 24-hours thickness swelling and water absorption as compared to control samples.

As shown by the above examples, a small amount of additive material (about 3-4% by weight of the resin material) is adequate to improve resin performance, as shown in Table 1, and OSB properties, as shown in Tables 2-10. Additive materials in the range of up to about 8% by weight of the resin material are especially suitable.

All patents, patent applications, provisional applications, and publications referred to or cited herein are incorporated by reference in their entirety, including all figures and tables, to the extent they are not inconsistent with the explicit teachings of this specification.

It should be understood that the examples and embodiments described herein are for illustrative purposes only and that various modifications or changes in light thereof will be suggested to persons skilled in the art and are to be included within the spirit and purview of this application and the scope of the appended claims. In addition, any elements or limitations of any invention or embodiment thereof disclosed herein can be combined with any and/or all other elements or limitations (individually or in any combination) or any other invention or embodiment thereof disclosed herein, and all such combinations are contemplated with the scope of the invention without limitation thereto.

We claim:

1. A reinforced adhesive comprising polymeric diphenylmethane diisocyanate (pMDI) and an additive material comprising cellulose nanofibril aggregates in combination with nanoclay and microclay.

2. The reinforced adhesive according to claim 1, wherein said adhesive is an adhesive used for the production of composite wood products.

3. The reinforced adhesive according to claim 1, wherein said reinforced adhesive further comprises an additional adhesive selected from the group consisting of liquid phenolic resins, powdered phenolic resins, amino-based resins (UF), melamine formaldehyde (MF), melamine-urea-formaldehyde (MUF), phenol-urea-formaldehyde (PUF), melamine-urea-phenol-formaldehyde (MUPF), phenol-melamine-urea-formaldehyde (PMUF), protein adhesive, natural phenolic adhesives, epoxy resin, unsaturated polyester and any combination thereof.

4. The reinforced adhesive according to claim 1, wherein said cellulose nanofibril aggregates are selected from cellulose nanofibers, bacterial cellulose, cellulose whisker, and cellulose nanotubules.

5. The reinforced adhesive according to claim 1, wherein said additive material comprises a combination of microfibers and/or nanofibers and nanoclays in a (w/w) ratio (microfiber/nanofiber:nanoclay) of about 1:1, 2:1, 3:1, 4:1, 5:1 or 6:1.

6. The reinforced adhesive according to claim 5, wherein said ratio of microfibers and/or nanofibers to nanoclays is about 4:1.

7. The reinforced adhesive according to claim 5, wherein said additive material comprises a combination of microfibers, nanofibers and nanoclays in a ratio (microfiber/nanofiber:nanoclay) of about 1:1, 2:1, 3:1, 4:1, 5:1 or 6:1.

8. The reinforced adhesive according to claim 1, wherein said cellulose nanofibril aggregates comprise cellulose nanofibers and cellulose microfibers.

9. The reinforced adhesive according to claim 1, wherein the nanoclay is montmorillonite nanoclay.

10. The reinforced adhesive according to claim 9, wherein montmorillonite nanoclay is less than 1% by dry weight of the reinforced adhesive.

11. An engineered product comprising the reinforced adhesive of claim 1 and:
a) wood strands or fibers to form an engineered wood product; or
b) lignocellulosic materials to form a composite product.

12. The engineered wood product according to claim 11 having a density of about 30-50 lbs/ft$^3$.

13. The engineered wood product according to claim 11, wherein said wood product is plywood, laminated veneer lumber (LVL), particle board, fiberboard, wafer board, glue-lam beams, structural composite lumber, oriented strand board (OSB), oriented strand lumber (OSL) or parallel strand lumber (PSL).

* * * * *

UNITED STATES PATENT AND TRADEMARK OFFICE
CERTIFICATE OF CORRECTION

PATENT NO. : 10,100,232 B2
APPLICATION NO. : 14/977678
DATED : October 16, 2018
INVENTOR(S) : Siqun Wang and Cheng Xing Page 1 of 1

It is certified that error appears in the above-identified patent and that said Letters Patent is hereby corrected as shown below:

In the Specification

<u>Column 4,</u>
Line 15, "pMDFUF" should read --pMDI/UF--.

<u>Column 7,</u>
Line 65, "Resin: 13B 122" should read --Resin: 13B122--.

Signed and Sealed this
Thirtieth Day of July, 2019

Andrei Iancu
*Director of the United States Patent and Trademark Office*